United States Patent
Rhoades et al.

(10) Patent No.: US 11,409,971 B1
(45) Date of Patent: Aug. 9, 2022

(54) PROGRAMMING AND TEST MODES FOR POWERED CARDS AND DEVICES

(71) Applicants: Randy L. Rhoades, Swissvale, PA (US); Allen D. Bowers, Aspenwall, PA (US)

(72) Inventors: Randy L. Rhoades, Swissvale, PA (US); Allen D. Bowers, Aspenwall, PA (US)

(73) Assignee: DYNAMICS INC., Pittsburgh, PA (US)

( * ) Notice: Subject to any disclaimer, the term of this patent is extended or adjusted under 35 U.S.C. 154(b) by 0 days.

(21) Appl. No.: 13/657,682

(22) Filed: Oct. 22, 2012

Related U.S. Application Data (60) Provisional application No. 61/550,422, filed on Oct. 23, 2011.

(51) Int. Cl.
- *G06K 5/00* (2006.01)
- *G06K 7/08* (2006.01)
- *G06K 19/06* (2006.01)
- *G06K 7/00* (2006.01)

(52) U.S. Cl.
CPC ................. *G06K 7/0095* (2013.01)

(58) Field of Classification Search
USPC ........ 235/380, 449, 451, 492, 493, 375, 438
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |

(Continued)

FOREIGN PATENT DOCUMENTS

| | | |
|---|---|---|
| JP | 05210770 | 8/1993 |
| JP | 05210770 A | 8/1993 |

(Continued)

OTHER PUBLICATIONS

U.S. Appl. No. 60/594,300, Poidomani et al.

(Continued)

*Primary Examiner* — Tuyen K Vo
(74) *Attorney, Agent, or Firm* — Andrew Veter (57) ABSTRACT

Programming fixtures are provided that program devices, such as payment cards, with data, such as personal data, using light transmitters and receivers. A code sequence may be entered into the devices to transition the devices into one of several test modes. Pressing a button may cause diagnostic data to be communicated by the device. Pressing another button may cause default data to be communicated by the device. A personalization test module may capture the diagnostic data and/or default data to document and/or verify operation of the device.

11 Claims, 7 Drawing Sheets

(56) References Cited

U.S. PATENT DOCUMENTS

| | | |
|---|---|---|
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,954,705 B2 | 6/2011 | Mullen |
| 8,011,577 B2 | 9/2011 | Mullen et al. |
| 8,015,395 B1 * | 9/2011 | Lewis .............. G06F 1/305 360/101 |
| 8,020,775 B2 | 9/2011 | Mullen et al. |
| 8,066,191 B1 | 11/2011 | Cloutier et al. |
| 8,074,877 B2 | 12/2011 | Mullen et al. |
| 8,172,148 B1 | 5/2012 | Cloutier et al. |
| 8,282,007 B1 | 10/2012 | Cloutier et al. |
| 8,286,876 B2 | 10/2012 | Mullen et al. |
| 8,302,872 B2 | 11/2012 | Mullen |
| 8,322,623 B1 | 12/2012 | Mullen et al. |
| 8,348,172 B1 | 1/2013 | Cloutier et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| 8,485,437 B2 | 7/2013 | Mullen et al. |
| 8,485,446 B1 | 7/2013 | Mullen et al. |

(56) References Cited

U.S. PATENT DOCUMENTS

| | | |
|---|---|---|
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,628,022 B1 | 1/2014 | Rhoades et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,827,153 B1 | 9/2014 | Rhoades et al. |
| 8,881,989 B2 | 11/2014 | Mullen et al. |
| 8,931,703 B1 | 1/2015 | Mullen et al. |
| 8,944,333 B1 | 2/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,053,398 B1 | 6/2015 | Cloutier |
| 9,064,225 B2 | 6/2015 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0149457 A1* | 7/2005 | Cihula .............. 705/65 |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0093465 A1* | 4/2008 | Lee .............. G01R 31/3187 235/492 |
| 2008/0096326 A1 | 4/2008 | Reed |
| 2008/0103972 A1* | 5/2008 | Lanc .............. 705/44 |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0095812 A1* | 4/2009 | Brown et al. .............. 235/380 |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159709 A1 | 6/2009 | Mullen |
| 2009/0159710 A1 | 6/2009 | Mullen et al. |
| 2009/0159712 A1 | 6/2009 | Mullen et al. |
| 2009/0160617 A1 | 6/2009 | Mullen et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0308921 A1 | 12/2009 | Mullen |
| 2010/0065637 A1* | 3/2010 | Top .............. G07F 7/0833 235/438 |
| 2011/0028184 A1 | 2/2011 | Cooper |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272477 A1 | 11/2011 | Mullen et al. |

(56) References Cited

U.S. PATENT DOCUMENTS

| | | |
|---|---|---|
| 2011/0272478 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0197708 A1 | 8/2012 | Mullen et al. |
| 2012/0205443 A1* | 8/2012 | Routhenstein ... G06K 19/06196 235/380 |
| 2012/0205451 A1* | 8/2012 | Poidomani ......... G06K 19/0702 235/492 |
| 2012/0209744 A1 | 8/2012 | Mullen et al. |
| 2012/0241523 A1* | 9/2012 | Poidomani et al. .......... 235/492 |
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2013/0010962 A1* | 1/2013 | Buer et al. .................... 380/270 |
| 2013/0020396 A1 | 1/2013 | Mullen et al. |
| 2013/0085682 A1* | 4/2013 | Bousamra ...................... 702/21 |
| 2013/0282573 A1 | 10/2013 | Mullen et al. |
| 2013/0282575 A1 | 10/2013 | Mullen et al. |
| 2014/0054384 A1 | 2/2014 | Cloutier et al. |

FOREIGN PATENT DOCUMENTS

| | | |
|---|---|---|
| WO | WO9852735 | 11/1998 |
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
PCT/US11/25047, dated Feb. 16, 2011, Mullen.
PCT/US11/37041, dated May 18, 2011, Mullen et al.
PCT/US11/45991, dated Jul. 29, 2011, Mullen et al.
PCT/US12/31919, dated Apr. 2, 2012, Mullen et al.
PCT/US12/31921, dated Apr. 2, 2012, Mullen et al.
PCT/US12/37237, dated May 10, 2012, Mullen et al.
PCT/US13/26746, dated Feb. 19, 2013, Mullen et al.
PCT/US11/25047, Mullen, filed Feb. 16, 2011.
PCT/US11/37041, Mullen et al., filed May 18, 2011.
PCT/US11/45991, Mullen et al., filed Jul. 29, 2011.
PCT/US12/31919, Mullen et al., filed Apr. 2, 2012.
PCT/US12/31921, Mullen et al., filed Apr. 2, 2012.
PCT/US12/37237, Mullen et al., filed May 10, 2012.
PCT/US13/26746, Mullen et al., filed Feb. 19, 2013.

* cited by examiner

PROGRAMMING AND TEST MODES FOR POWERED CARDS AND DEVICES

CROSS-REFERENCE TO RELATED APPLICATION

This application claims the benefit of U.S. Provisional Patent Application No. 61/550,422, titled "PROGRAMMING AND TEST MODES FOR POWERED CARDS AND DEVICES," filed Oct. 23, 2011, which is hereby incorporated by reference herein in its entirety.

BACKGROUND OF THE INVENTION

This invention relates to powered cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips (e.g., EMV chips) to communicate to one or more RFID readers or IC chip readers, respectively. A card may include devices to receive information. For example, an RFID and IC chip (e.g., EMV chip) may both receive information and communicate information to an RFID and IC chip reader, respectively.

A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may include one or more light transmitters and light receivers. The light transmitters and receivers may be the same, or different, devices. A light transmitter may be able to transmit visible, infrared, or visible and infrared light. A light transmitter may be able to transmit additional types of light (e.g., ultraviolet light). A light receiver may be able to receive visible, infrared, or visible and infrared light. A light receiver may be able to receive additional types of light (e.g., ultraviolet light). A light transmitter may take the form of, for example, an LED. A light receiver may take the form of, for example, a photo-transistor, photo-diode, photo-resistor, or an LED.

A card may include a light transmitter (e.g., an infrared transmitter) about one end of the card and a light receiver (e.g., an infrared receiver) about the opposite end of the card. In doing so, the light transmitter and receiver may be located at a distance from one another (e.g., greater than half an inch, one inch, one and a half inches, two inches, or two and a half inches away from one another) such that the light receiver of the card cannot pick up transmissions from the light transmitter of the card. For example, a light receiver may be located along about a top edge of a card at a particular distance from one side edge (e.g., 1.067 inches from one side edge). A light transmitter may also be located about the top edge at that same particular distance from the other side edge (e.g., 1.067 inches from the other side edge). Accordingly, a programming fixture may include a light transmitter spaced similarly from a light receiver such that the light receiver of the programming fixture may communicate with the light transmitter of the card and the light transmitter of the programming fixture may communicate with the light receiver of that same card. In this manner, cards may be moved through the programming fixture and stopped in front of the programming fixture for programming. A programming module may be included with multiple programming fixtures such that multiple programming fixtures may simultaneously program cards.

A personalization machine may include multiple modules (e.g., multiple programming modules or multiple diagnostic modules) such that cards may be personalized and/or diagnosed utilizing the personalization machine. For example, a personalization machine may include one or more modules for embossing a card, modules for printing indicia on a card, modules for writing to a static magnetic stripe of a card, modules for reading from a static magnetic stripe of a card, modules for reading information from a magnetic emulator of a card, modules for writing information to a magnetic emulator of a card, modules for reading and/or writing information to an IC chip (e.g., EMV chip) of a card, modules for reading and/or writing information to an RFID tag of a card, modules for laser engraving a card, modules for flex-testing a card, modules for testing physical features of a card (e.g., thickness of a card), modules for placing holograms onto a card, modules for placing protective coatings on a card, modules for placing information onto an exterior surface of the card that corresponds to data contained within a memory of the card (e.g., a serial number), modules for retrieving diagnostic data from a card (e.g., battery voltage magnitude), and modules for placing a material operable to receive an ink-based signature/mark on a card.

The personalization machine may be able to communicate with an entity (e.g., a remote server) to, for example, download information to be programmed into a card. The personalization machine may be able to communicate with an entity (e.g., a remote server) to, for example, upload information confirming data programmed into a card. The personalization machine may be able to upload information from a card that corresponds to diagnostic data, default data, or any other type of data that may be associated with a card.

Various types of information may be programmed into a card. Payment account information, for example, such as the account holder's name, payment account number, and expiration date of the payment account may be programmed into a memory of a card. Account information for one or more accounts (e.g., credit, debit, gift, medical, or security accounts) may be programmed into a memory of a card. Once programmed, a personalization machine may read the account information back from the card and may, for example, verify that the account information matches account information intended for that card.

A memory of a card may, for example, receive processing instructions (e.g., firmware) that may be executed by a processor of a card. Such processing instructions may include default account information that may be retrieved by the processor and communicated by the processor to a personalization machine. Accordingly, for example, prior to programming a memory of a card with account information, default information may be accessed by a processor of a card and communicated to a personalization machine to verify that basic functions of the card are operational (e.g., default information may be communicated by a processor of the card via a dynamic magnetic communications device of the card to a magnetic stripe reader of the personalization machine). In doing so, for example, basic operational capability of a card may be verified by a personalization machine after one of various production stages of the card (e.g., after a lamination process is completed to form the card, but prior to personalizing an exterior of the card) have been completed.

A processor of a card may, for example, retrieve diagnostic information associated with a card. For example, internal parameters (e.g., a battery voltage, an internal temperature, or a number of times that a card has been swiped through a magnetic stripe reader) may be retrieved by a processor and reported by the processor as diagnostic information to a personalization machine. Accordingly, for example, a processor of a card may populate a magnetic stripe message with diagnostic information retrieved from within a card and may report the diagnostic information to a personalization machine (e.g., a magnetic stripe message populated with diagnostic information may be communicated by a dynamic magnetic stripe communications device of a card to a magnetic stripe reader of the personalization machine).

A memory of a card may receive firmware that may be executed by a processor of a card that may place the card into one of several operational modes. A card may, for example, include one or more manual input devices (e.g., buttons) that when pressed in a particular sequence may cause a processor of the card to enter a mode (e.g., a personalization mode, an operational mode, a diagnostic test mode, a default test mode, or an operational test mode) corresponding to the button press sequence. A card may, for example, include one or more light sources (e.g., LEDs), one or more audio devices, and one or more tactile devices (e.g., vibration devices) that may provide visible, audible, and/or tactile feedback that is indicative of the selected operational mode of the card.

Manual input (e.g., a particular button-press sequence of one or more buttons) may, for example, place a processor of a card into a personalization mode that causes the processor to wait for information to be programmed into a memory of the card. Accordingly, for example, all functions of the card may be disabled except for an input and/or output device (e.g., an IR transceiver) that may receive personalization information (e.g., one or more account numbers, account names, and expiration dates) from a personalization machine. A card may provide indicia (e.g., flash an LED multiple times) that may indicate to a user of the card that the card is placed into the personalization mode.

Manual input may, for example, transition a processor of a card from a personalization mode into an operational mode, where subsequent manual input (e.g., pressing a button) may, for example, cause a particular code to be communicated by a processor of a card (e.g., communicated after the presence of a magnetic read head is detected by a processor of the card). The code may, for example, include magnetic stripe information communicated by a dynamic magnetic stripe communications device of a card that may be representative of account information (e.g., payment account information) selected by a user of the card at a point of sale terminal. The magnetic stripe information may, for example, be received by the point of sale device and utilized to settle a purchase transaction.

Manual input may, for example, cause a processor of a card to transition from an operational mode to a personalization mode. Accordingly, for example, a processor of a card may recognize a particular button sequence as a reset sequence. Accordingly, all functions of the card may be disabled except for certain input and/or output devices (e.g., one or more buttons and an IR transceiver). IR information received during reset mode may, for example, be received as new personalization information and may be used to overwrite data that may already reside within the card's memory.

Manual input may, for example, cause a processor of a card to transition from a personalization mode into a diagnostic test mode. In diagnostic test mode, a processor of a card may receive a signal (e.g., a signal generated from a press of a button on a card) and based on the signal perform a particular function. For example, a processor may gather diagnostic information (e.g., battery voltage, card temperature, and swipe count) from the card and based upon a signal received, may communicate the diagnostic information. Accordingly, for example, the processor may generate a magnetic stripe message containing the diagnostic information and may communicate the magnetic stripe message to a personalization machine (e.g., when a processor of the card detects a magnetic stripe reader of the personalization machine).

Manual input may, for example, cause a processor of a card to transition from a programming mode into a default test mode. In default test mode, a processor of a card may communicate information (e.g., default information contained within a memory of the card) when a signal is received from a manual input (e.g., button press) on the card. Accordingly, for example, a processor may generate a magnetic stripe message containing the default information and may communicate the magnetic stripe message to a personalization machine upon detection of a magnetic stripe reader of the personalization machine.

Manual input may, for example, cause a processor of a card to communicate diagnostic information while in a normal operational mode. Accordingly, for example, the processor may generate a magnetic stripe message containing the diagnostic information (e.g., the diagnostic information may reside within discretionary data fields of the magnetic stripe message) and may communicate the magnetic stripe message to a point of sale device during a purchase transaction. Backend processing may parse the magnetic stripe message and may forward the diagnostic information to be stored within a database for subsequent access by a test module of a personalization machine.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
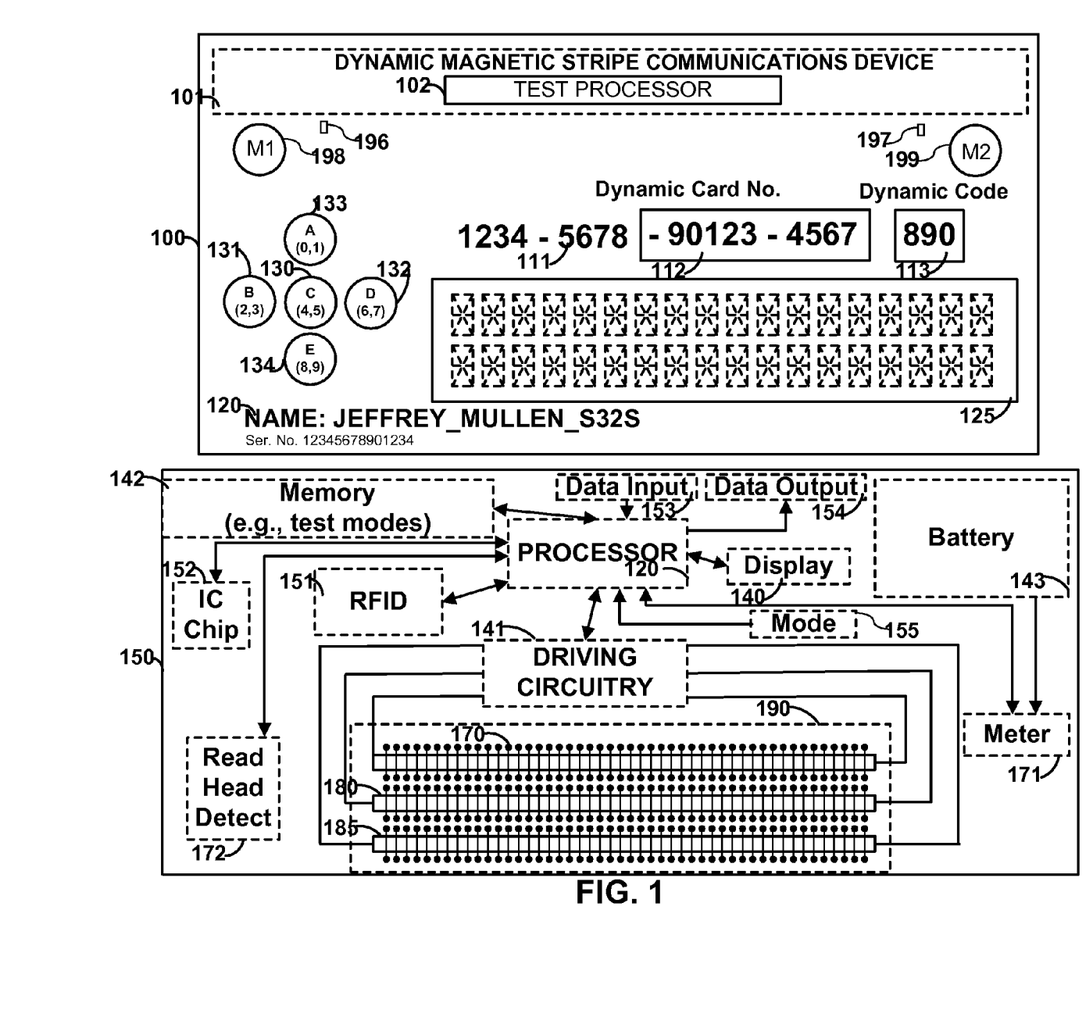
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date, a card expiration date, or a card serial number).

Card 100 may include one or more buttons such as buttons 130-134. Such buttons may be mechanical buttons, capacitive buttons, or a combination of mechanical and capacitive buttons. Card 100 may include buttons 198 and 199. Buttons 198 and/or 199 may be used, for example, to place a processor of card 100 into a mode (e.g., a mode used to receive programming of a user's personal payment card data or a mode used to provide diagnostic data from the card). A button (e.g., buttons 198 and/or 199) may be utilized in a variety of ways (e.g., to communicate information through a dynamic magnetic stripe communications device indicative of a user's intent to purchase a particular product with points instead of credit).

Test processor 102 may receive signals from buttons 198 and/or 199 and may be construed by test processor 102 as signals indicative of a particular test mode. Indicia associated with a selected test mode may be communicated through visible feedback (e.g., LEDs 196 and 197), audible feedback, or tactile feedback. Accordingly, for example, a user of card 100 may place test processor 102 into a particular test mode of operation via manual input (e.g., via buttons 198 and 199) and test processor 102 may acknowledge the selected test mode by providing feedback associated with the selected test mode.

Persons skilled in the art will appreciate that a physical payment card may be provided as a virtual payment card on a display of any device, such as a mobile telephonic device or personal computing device. A button on a physical payment card may be a button on any device, such as a mobile telephonic device or personal computing device. Accordingly, for example, a device (e.g., a cell phone) may receive manual input from a manual user interface (e.g., a virtual button on a capacitive touch screen) and communicate information indicative of the selection (e.g., a selection of a diagnostic feature) to another device (e.g., a test module of a personalization machine) via a communications device (e.g., an RF-based communications device).

Architecture 150 may be utilized with any card. Architecture 150 may include processor 120. Processor 120 may have on-board memory for storing information (e.g., application code to define test modes for a card). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular card. For example, memory 142 may store discretionary data codes associated with buttons of a card (e.g., card 100 of FIG. 1). Such codes may be recognized by remote servers to effect particular actions. For example, a code may be stored on memory 142 that causes a non-merchant product to be purchased with points during a merchant transaction.

Memory 142 may be partially implemented as non-volatile memory. Accordingly, memory 142 may be programmed with, for example, a programming protocol that may define how data (e.g. IR data) may be received by data input 153 and how data (e.g., IR data) may be transmitted by data output 154.

Memory 142 may receive data as received from data input 153 (e.g., an IR receiver). For example, data may be received by memory 142 that may be indicative of a universal identification number (e.g., a serial number) associated with a card (e.g., card 100 of FIG. 1). Such a universal identification number may, for example, uniquely identify a card (e.g., card 100 of FIG. 1). Memory 142 may receive data via data input 153 that may represent a security code that may be associated with the universal identification number of a card (e.g., card 100 of FIG. 1).

Memory 142 may provide data, such as a universal identification number (e.g., a serial number) associated with a card (e.g., card 100 of FIG. 1), to data output 154. Accordingly, data output 154 (e.g., an IR transmitter) may transmit such a universal identification number to, for example, a personalization machine. The personalization machine may relay the universal identification number to an entity (e.g., a remote server), which in turn, may respond with personalization data that may be associated with the universal identification number of a card (e.g., card 100 of FIG. 1).

Memory 142 may receive data from data input 153 (e.g., an IR receiver) that may be associated with a universal identification number of a card (e.g., card 100 of FIG. 1). For example, one or more account numbers, user names, discretionary data, and expiration dates may be stored within memory 142. Such data may be provided by a card (e.g., card 100 of FIG. 1), for example, as one or more tracks of magnetic stripe data during a transaction (e.g., a purchase transaction).

Processor 120 may operate in a mode as may be defined by application code in memory 142. One or more meters 171 may, for example, gather diagnostic information associated with a card (e.g., card 100 of FIG. 1), such as a magnitude of voltage generated by battery 143, a temperature of a card (e.g., card 100 of FIG. 1), or a number of times a card (e.g., card 100 of FIG. 1) may have been swiped through a magnetic stripe reader. Processor 120 may provide the diagnostic information within one or more tracks of magnetic stripe information to a test module of a personalization machine.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader.

Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a magnetic material and/or a non-magnetic material).

Each electromagnetic field generator may communicate information serially to a receiver of a magnetic stripe reader for a particular magnetic stripe track. Read-head detector 172 may be utilized to sense the presence of a magnetic stripe reader (e.g., a read-head housing of a magnetic stripe reader). The sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time.

Processor 120 may, for example, communicate user-specific information and card-specific information (e.g., diagnostic data, default data, and any other type of data associated with card 100 of FIG. 1) through RFID 151, IC chip 152 (e.g., EMV chip 152), data output (e.g., IR data output 154), data input (e.g., IR data input 153) and electromagnetic generators 170, 180, and 185 to readers coupled to information processing servers (e.g., a test module of a personalization machine). Driving circuitry 141 may be utilized by processor 120, for example, to control electromagnetic generators 170, 180, and 185.

Figure 2:
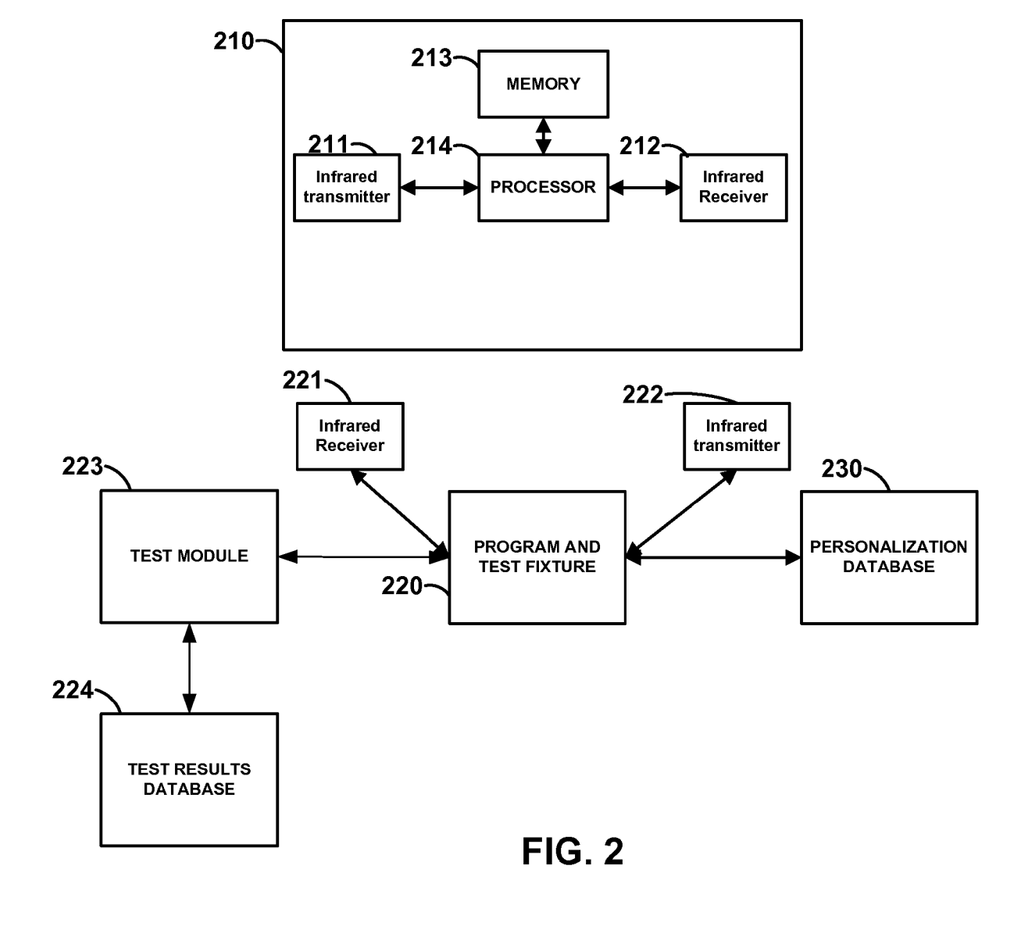
FIG. 2 is an illustration of a personalization system constructed in accordance with the principles of the present invention.

FIG. 2 shows card 210 that may include memory 213 (e.g., for storing application code, personal data, and test routines), transmitter 211, processor 214, and infrared receiver 212. Persons skilled in the art will appreciate that card 210 may include, for example, an infrared receiver and a LED capable of emitting visible light to perform communications with a programming and test fixture. Such a light-emitting-diode may, alternatively for example, be capable of emitting infrared light. A receiver may be, for example, an infrared sensitive photo-transistor or an LED.

Programming and test fixture 220 may be coupled to receiver 221 and transmitter 222. Receiver 221 may be coupled to IR transmitter 211 and transmitter 222 may be coupled to IR receiver 212. Accordingly, personalization data retrieved from an entity (e.g., personalization database 230) may be programmed into memory 213 of card 210.

Test routines retrieved from an entity (e.g., test module 223) may be used to exercise processor 214 and memory 213 of card 210 via the IR interface of programming and test fixture 220. Accordingly, for example, test diagnostic data, test default data, and any other type of test data may be transmitted by IR transmitter 211 to IR receiver 221. In so doing, for example, testing of card 210 may be monitored by test module 223 and results of such testing may be stored within test results database 224.

Personalization database 230 may be utilized, for example, to retrieve personal information for a card (e.g., a customer's name, security code, credit card number, expiration date, and associated discretionary data). This information may be stored on memory 213 of card 210 and utilized by processor 214 to communicate this information through an output device operable to be read by a reader (e.g., an exposed IC chip, RFID, or dynamic magnetic stripe communications device).

Figure 3:
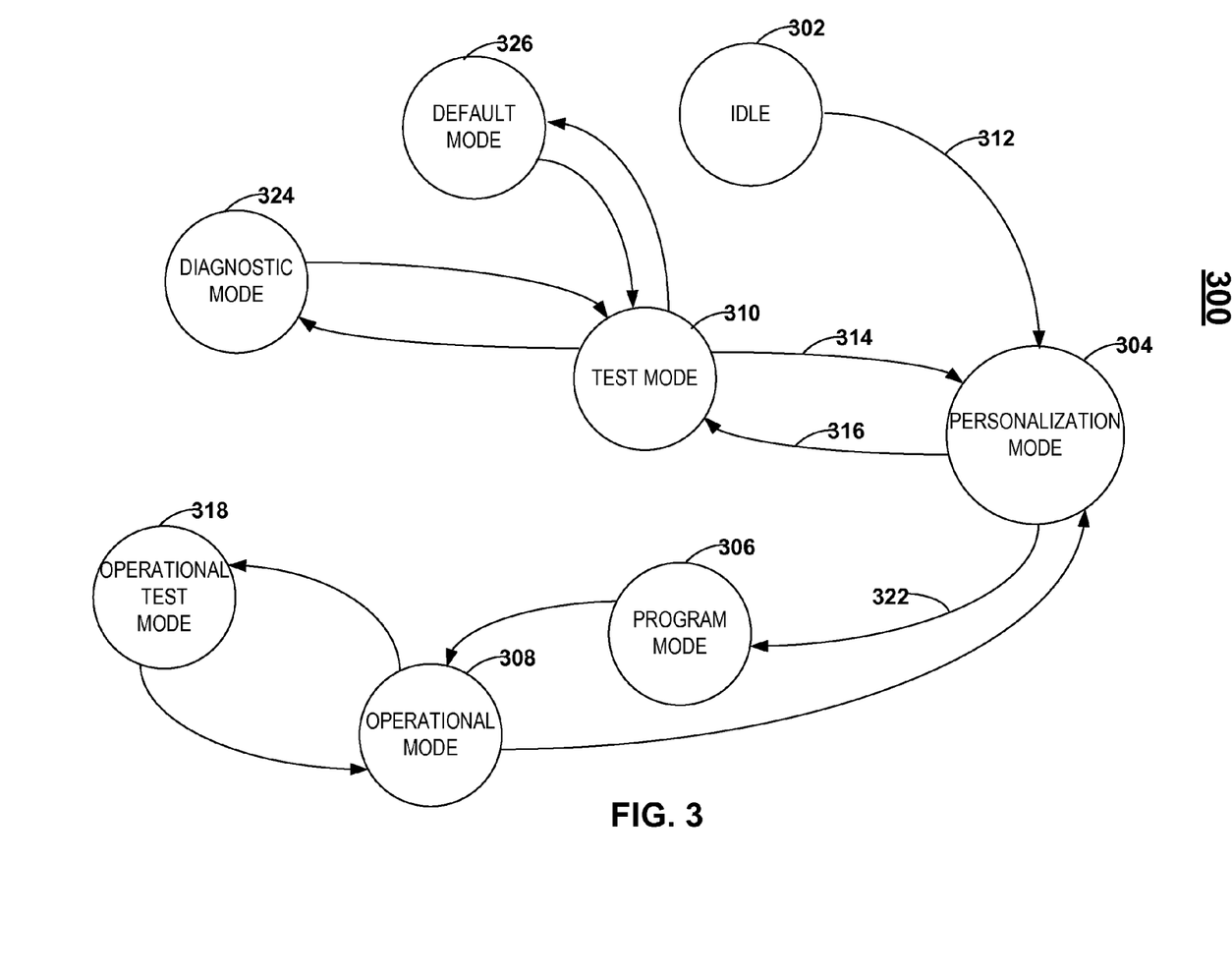
FIG. 3 is an illustration of a mode transition flow diagram constructed in accordance with the principles of the present invention.

FIG. 3 shows mode transition flow diagram 300. Mode 302 represents a state of a card or device at one of several stages of construction, where a card or device may contain multiple printed circuit boards and other components and assemblies that may perform particular functions. In manufacturing multiple boards dedicated to particular functions, functionality and reliability of each board may be verified separately before completing the assembly. Once verified, one or more of the circuit boards may be mechanically and/or electrically coupled together via, for example, epoxy or conductive tape to form, for example, an electronics package. Such an electronics package may also include a dynamic magnetic communications device. The electronics package may then be laminated to form a final card or device assembly. Such a lamination may occur, for example, in an injection molding process (e.g., a reaction injection molding process). A laminated card or device may contain top and bottom layers that may, for example, be comprised of a silicon-based material or a polyurethane-based material and a middle layer that may contain one or more electronics packages.

A memory of the card or device may contain executable application code (e.g., firmware) that may have been downloaded into a memory of the card or device or into a memory of a processor of a card or device. A processor of the card or device may be executing the application code and may be in idle mode 302 waiting for external input that may cause the processor to execute transition 312 to place the card or device into personalization mode 304.

Transition 312 may, for example, be caused by manual input to the card or device (e.g., one or more buttons may be pressed in a particular sequence). Transition 312 may, for example, be indicated by feedback (e.g., an LED on a card may blink twice quickly) to inform a user of the card or device that a processor of the card or device has entered personalization mode 304.

In personalization mode 304, a card or device may undergo multiple stages of personalization and as a result, may be subjected to one or more modules of a personalization machine. During personalization mode 304, for example, a card holder's personal data and/or card data may be placed on the exterior of the card or device (e.g., printed, embossed, or laser etched) as well as programmed into a memory of the card or device.

A card or device may, for example, be placed into a programming module of a personalization machine, whereby input and/or output capabilities of a card or device (e.g., an IR transceiver) may interface with the programming module of the personalization machine. For example, an IR transceiver of the card or device may detect a presence of the programming module of the personalization machine and a processor of the card or device may execute transition 322 to place the card or device into program mode 306. Accordingly, for example, a cardholder's personal data may be downloaded into a memory of the card or device (e.g., via IR data transfer) in program mode 306. Once programmed, a processor of the card or device may transition to operational mode 308 where the card or device may be used in normal operations (e.g., used at a point of sale device to complete purchase transactions).

Prior to programming and while in personalization mode 304, manual input (e.g., one or more buttons of the card or device pressed in a particular sequence) may, for example, cause a processor of a card or device to execute transition 316. Accordingly, for example, a processor of the card or device may transition into test mode 310 via transition 316. Transition 316 may, for example, be indicated by feedback (e.g., all LEDs on a card may blink once) to inform a user of the card or device that a processor of the card or device has entered test mode 310.

In test mode 310, a card or device may be tested to evaluate a performance level of the card or device, where a processor of the card or device either communicates default data or communicates diagnostic data depending upon manual input received while in test mode 310. Default data may, for example, reside in a memory of the card or device and may be retrieved by a processor and communicated as default data by the processor. Diagnostic data may, for example, be generated and communicated by a processor of the card or device and may reflect certain physical parameters associated with the card or device (e.g., version and revision numbers of application code being executed by a processor of the card or device, a unique serial number that identifies the card or device, a date stamp identifying when application code was downloaded into the card or device). Diagnostic data may, for example, be real-time data sampled from meters of the card or device (e.g., voltage, temperature, and swipe count meters) and communicated by a processor of the card or device to reflect an operational status of the card or device (e.g., whether a voltage level produced by a battery of the card or device is approaching a minimally acceptable voltage magnitude).

Manual input (e.g., one or more buttons of the card or device pressed in a particular sequence) while a processor of a card or device is in test mode 310 may, for example, cause the processor to transition to diagnostic mode 324. In diagnostic mode 324, for example, a processor of a card or device may sample diagnostic information (e.g., battery voltage level and temperature) from meters contained within the card or device. A processor of the card or device may communicate the diagnostic information to a module of a personalization machine (e.g., the processor may generate a magnetic stripe message containing the diagnostic data and an operator may swipe the card through a magnetic stripe reader of the personalization machine to communicate the diagnostic information to the personalization machine). Accordingly, for example, a card or device may be tested in diagnostic mode 324 over a period of time (e.g., 2-3 days) to determine a rate at which certain parameters (e.g., a magnitude of voltage generated by a battery of the card or device) may be changing. In so doing, for example, a personalization operator may evaluate the integrity of the card or device based upon an understanding of the diagnostic data received from the card or device over time.

Manual input (e.g., a different button press than was used to enter diagnostic mode 324) while a processor of a card or device is in test mode 310 may, for example, cause the processor to transition to default mode 326. In default mode 326, for example, a processor of a card or device may collect default data (e.g., data contained within a memory of the card or device) and the processor may communicate the default data to a test module of a personalization machine (e.g., the processor may generate a magnetic stripe message containing the default data and an operator may swipe the card through a magnetic stripe reader of the personalization machine to communicate the default data to the personalization machine). Accordingly, for example, an operator may confirm that the card or device is operational based upon a verification that the default data received from the card or device matches a data set that should have been received from the card or device.

An operator of a personalization machine may confirm proper operation of a card or device while cycling a processor of the card or device through one or more cycles of test mode 310, diagnostic mode 324, and default mode 326. Manual input (e.g., one or more buttons of a card or device pressed in a particular sequence) may, for example, cause a processor of a card or device to execute transition 314 to transition to personalization mode 304 from test mode 310 once verification tests of the card or device are completed. Feedback indicia (e.g., one or more LEDs of a card flashing at different rates or flashing with different colors) may indicate that a processor of a card or device is operating in personalization mode 304. Subsequent manual input (e.g., pressing a single button) may cause a processor of the card or device to transition into program mode 306 where a programming interface of a card or device (e.g., an IR transceiver) may wait to receive personalization data from a programming device (e.g., an IR transceiver of a personalization machine).

Personalization data (e.g., account number, account holder name, discretionary data, and expiration date) may be programmed into a card or device in mode 306 and the card or device may transition to operational mode 308, where the card or device may be used to complete purchase transactions. For example, a processor of the card or device may communicate the personalization data to a point of sale device (e.g., a magnetic stripe reader, an EMV chip reader, or an RFID reader) to complete a purchase transaction with the point of sale device.

A manual input sequence (e.g., a series of button presses detected by a processor of a card or device as a reset sequence) may, for example, cause a processor of the card or device to transition back into personalization mode 304 from operational mode 308. Feedback indicia (e.g., a sequence of LED flashes) may, for example, indicate that personalization mode 304 has been reentered from operational mode 308. Accordingly, for example, a processor of an operational card or device may receive a reset sequence that may cause the processor to erase previously programmed personalization data and ready the card or device to reenter personalization mode 304. In so doing, a processor of an operational card or device may, for example, receive a manual input sequence that may cause the card or device to return to personalization mode 304 in preparation to be reprogrammed via program mode 306 and/or tested via test mode 310, diagnostic mode 324 and/or default mode 326.

Application code executed by a processor of a card or device may prevent the processor from transitioning back into personalization mode 304 once a transition from program mode 306 to operational mode 308 has been executed. Accordingly, for example, a processor of a card or device may no longer acknowledge a reset sequence that may be received via manual input to the card or device in an attempt to place the card or device back into personalization mode 304 from operational mode 308.

A manual input sequence (e.g., a series of one or more button presses detected by a processor of a card or device as an operational test sequence) may, for example, cause a processor of the card or device to transition to operational test mode 318 to communicate operational test data while being operational. Accordingly, for example, a processor of a card may communicate diagnostic data, default data, or any other type of data (e.g., within discretionary data fields of a magnetic stripe message) during a purchase transaction. A remote server may, for example, parse the magnetic stripe message to retrieve the operational test data and may forward the operational test data to a database that stores the operational test data. Accordingly, for example, a test module of a personalization machine may access the database to track an operational performance of a card or device over its operational lifetime.

Figure 4:
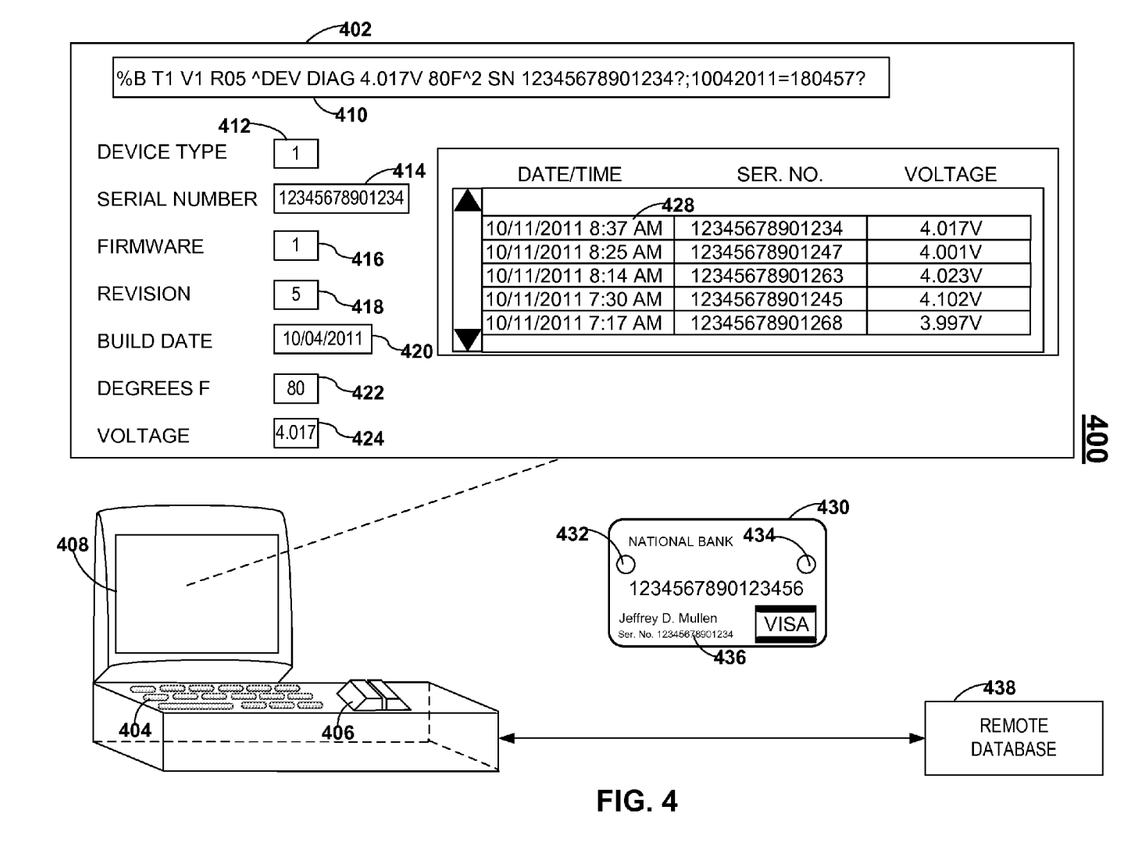
FIG. 4 is an illustration of a personalization system constructed in accordance with the principles of the present invention.

FIG. 4 shows personalization system 400, which may include one or more personalization machine input modules (e.g., keyboard 404), one or more personalization machine reader modules (e.g., magnetic stripe reader 406), one or more personalization machine output modules (e.g., display 408), device under test 430, and remote database 438. Device under test 430 may, for example, be a powered card or device having a manual input interface (e.g., buttons 432 and 434), a reader communications device (e.g., a dynamic magnetic stripe communications device, an RFID, or an EMV chip), a processor, a battery, diagnostic meters (e.g., a temperature sensor, a voltage sensor, and a swipe counter), and memory that may contain application code that may be executed by the processor.

Device under test 430 may, for example, be commanded to a diagnostic mode (e.g., by pressing either of buttons 432 or 434) in which a processor of device under test 430 may retrieve diagnostic data associated with device under test 430 (e.g., a temperature of device under test 430 and a voltage generated by a battery within device under test 430). Upon subsequent detection of a reader device (e.g., magnetic stripe reader 406) by a processor of device under test 430, a processor of device under test 430 may communicate a message (e.g., magnetic stripe message 410 to magnetic stripe reader 406) that may contain at least a portion of the diagnostic data retrieved by the processor of device under test 430.

Message 410 may, for example, be displayed onto man-machine interface 402, which may contain multiple data fields (e.g., two tracks of magnetic stripe data). A first track of magnetic stripe data may be bounded by a start sentinel (e.g., "% B") and a stop sentinel (e.g., "?"). A second track of magnetic stripe data may be bounded by a start sentinel (e.g., ";") and a stop sentinel (e.g., "?").

Each track of magnetic stripe data of magnetic strip message 410 may contain diagnostic data, which may be parsed by a processor of personalization system 400 and at least a portion of which may be displayed onto regions 412-424 of man-machine interface 402. For example, magnetic stripe message 410 may contain device type information 412 (e.g., a "1" may indicate that device under test 430 is a powered card and a "2" may indicate that device under test is a cellular telephonic device) that may be identified within magnetic stripe message 410 with a device type sentinel (e.g., "T"). Magnetic stripe message 410 may, for example, contain diagnostic information that may describe application code that may be executed by a processor of device under test 430 (e.g., firmware version 416 and firmware revision 418) that may be identified with firmware version and firmware revision sentinels (e.g., "V" and "R"). Magnetic stripe message 410 may, for example, contain diagnostic information that may include real-time operating conditions of device under test 430 (e.g., internal temperature 422 and battery voltage 424) that may be identified with diagnostic sentinels (e.g., "V" and "F").

Magnetic stripe message 410 may, for example, contain information that is specific to device under test 430 (e.g., serial number 414) that may be identified with a device sentinel (e.g., "SN"). Serial number 414 may, for example, be matched to serial number 436 that may be printed onto an exterior of device under test 430. Accordingly, for example, as diagnostic data is scanned for each device under test 430, a history of diagnostic data may be kept within a repository (e.g., database 438) that is uniquely indexed to each device under test 430 by, for example, serial number 436. Each single entry within database 438 (e.g., member 428) may contain at least a portion of diagnostic data scanned from each device under test 430. In so doing, for example, at least a portion of diagnostic data (e.g., battery voltage level) may be scanned for each device under test 430 over time and may be maintained within database 438 to create a history of diagnostic data over time. Such a history may, for example, be recalled from database 438 and viewed via man-machine interface 402.

Persons skilled in the art will appreciate that device under test 430 may be programmed to communicate any type of data as may be required. For example, manual input (e.g., pressing buttons 432 or 434) may cause a processor of device under test 430 to communicate default data that may be contained within a memory of device under test 430. Accordingly, for example, a test module of personalization system 400 may analyze the communicated default data to determine whether device under test 430 may be operating correctly (e.g., whether the default data communicated by a processor of device under test 430 matches a data set that is expected from device under test 430).

Figure 5:
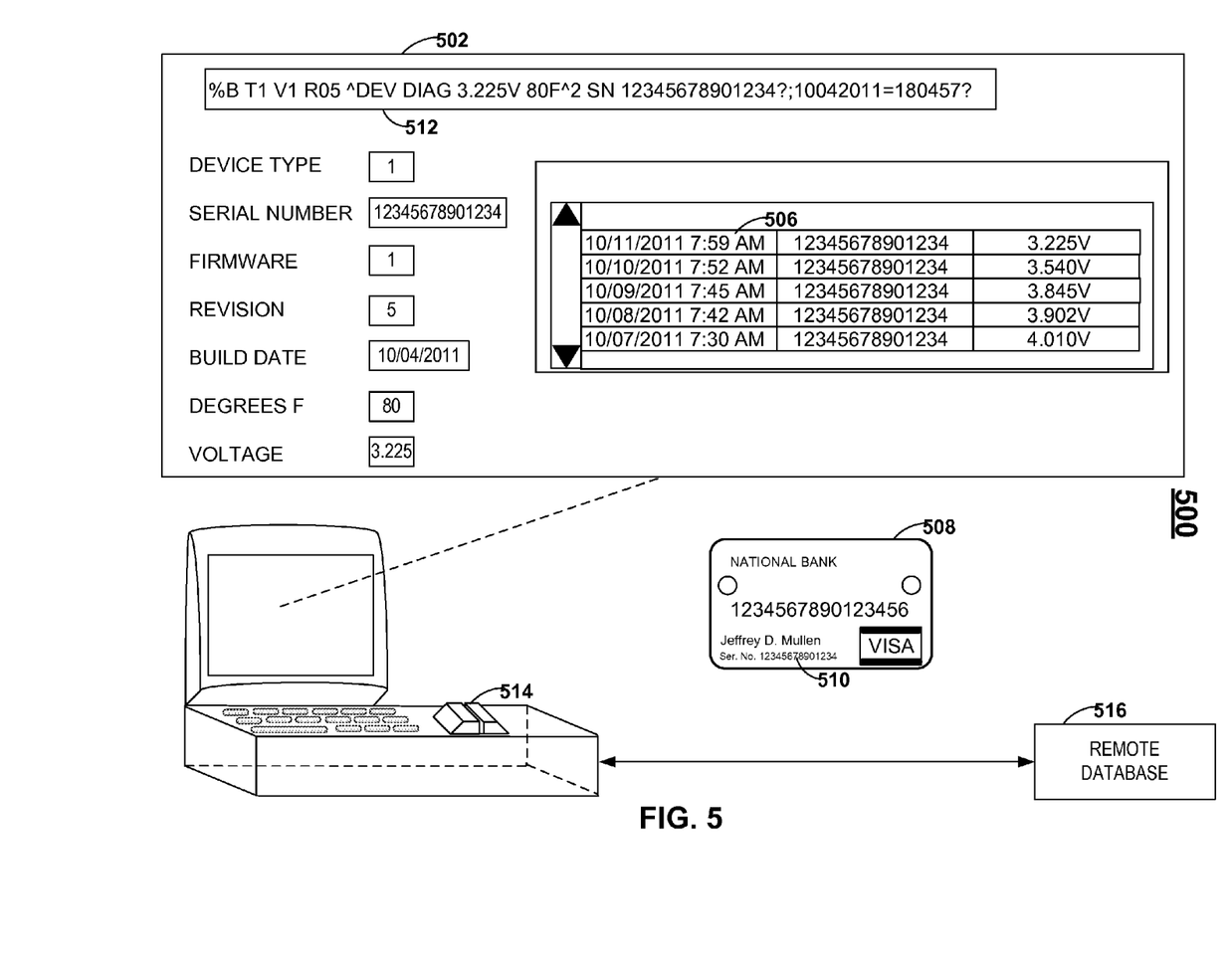
FIG. 5 is an illustration of a personalization system constructed in accordance with the principles of the present invention.

FIG. 5 shows personalization system 500, which may be used to track diagnostic data, or any other type of data, that may be associated with device under test 508 for a period of time (e.g., several days). Accordingly, for example, device under test 508 may be held in a production and test cycle until device under test 508 is cleared for release. In so doing, for example, certain diagnostic parameters that may be associated with device under test 508 may be monitored over a period of time to determine whether device under test 508 may be likely to survive for a complete life cycle duration (e.g., 2-4 years).

Production and test cycles may, for example, be tracked as data entries within database 516, where each entry may be indexed to a unique number (e.g., serial number 510) that may be associated with device under test 508 and printed on an exterior surface of device under test 508. Serial number 510 may, for example, be stored within a memory of device under test 508. Accordingly, for example, each time device under test 508 is scanned for diagnostic data, a processor of device under test 508 may report its serial number within a message (e.g., magnetic stripe message 512) that may be scanned by a reader device (e.g., magnetic stripe reader 514) along with all diagnostic data reported by a processor of device under test 508. Each scan may be tabulated and presented by man-machine interface 502 within indexed entries 506, where the most recent entry may be displayed at the top of indexed entries 506.

Personalization system 500 may be used to identify devices under test that may be defective by tracking diagnostic data that may be trending unfavorably. For example, a series of tests may be tracking the values of a diagnostic variable (e.g., battery voltage) over a period of time (e.g., several days). Variances in such a diagnostic variable may, for example, allow personalization system 500 to identify devices under test that may be likely to fall below acceptable performance levels before they have fulfilled their life expectancy. Accordingly, for example, an unusual change in diagnostic variable values (e.g., an unusual drop in battery voltage) over a period of several days may cause personalization system 500 to tag a particular device under test as defective. In so doing, for example, personalization system 500 may track battery voltage of device under test 508 over a period of several days and may reject device under test 508 from release due to an unusual drop in battery voltage (e.g., a drop of over 0.7 volts in battery voltage over a period of four days).

Figure 6:
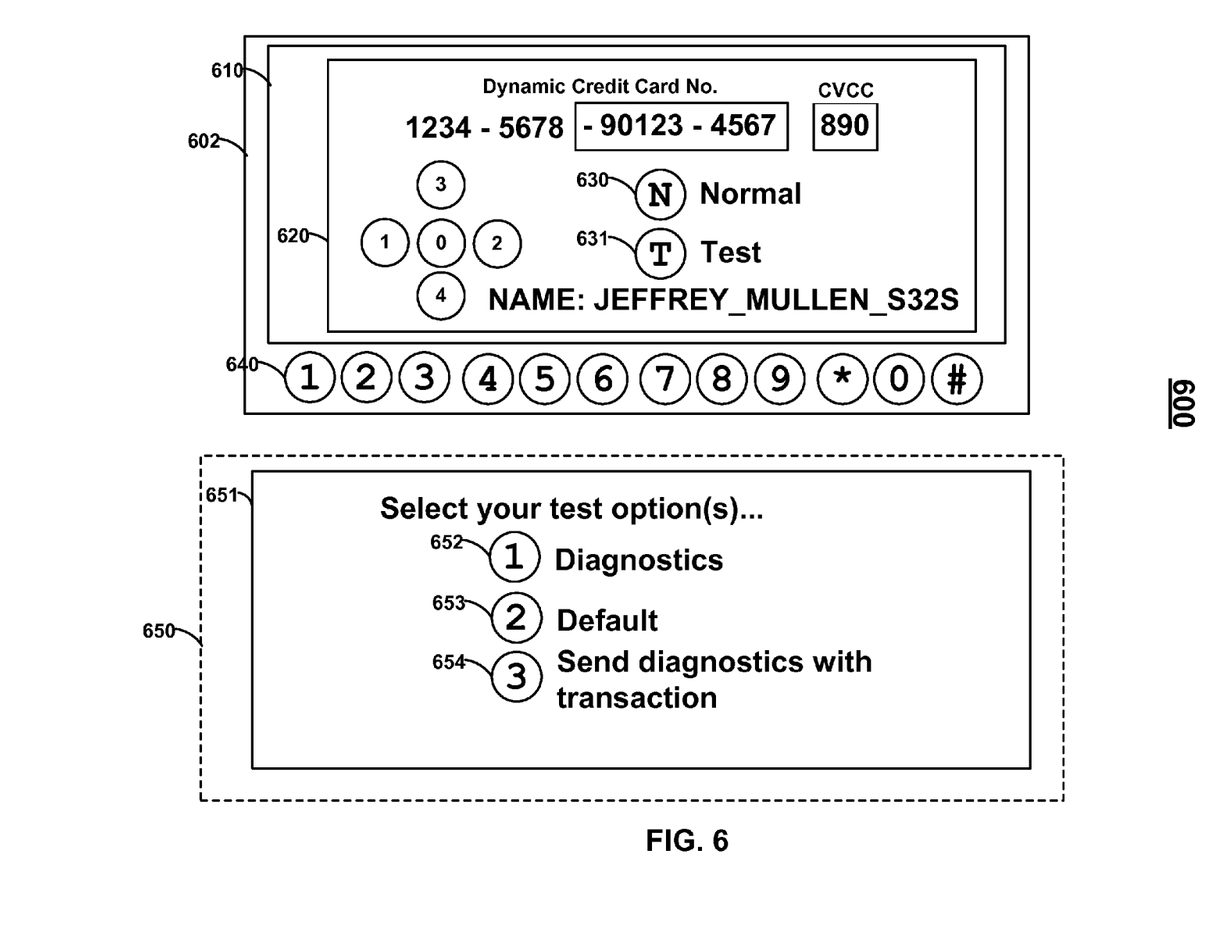
FIG. 6 is an illustration of a device constructed in accordance with the principles of the present invention.

FIG. 6 shows device 600 that may be, for example, a mobile device (e.g., a mobile cellular phone, an e-reader, or an electronic tablet). Any card provided herein may be provided as a virtual card on device 600. Mechanical buttons 640 may be utilized by a user to make selections (e.g., selections associated with a virtual card). Virtual buttons may be included that a user can activate (e.g., by utilizing a touch-screen displaying a virtual card) so that the user can make selections associated with the virtual card. Device 600 may include, for example, housing 602, display 610, virtual card 620, and virtual buttons 630 and 631. Device 600 may communicate to a card reader via electromagnetic signals (e.g., RF signals). Virtual button 630 may, for example, be associated with a normal activity. Button 631 may, for example, be associated with a test activity.

Display configuration 650 may be provided and may be displayed, for example, on a wireless device such as a wireless telephonic device or a wireless payment card. Configuration 650 may include graphical user interface 651 that may include, for example, virtual button 652, virtual button 653, and virtual button 654. A user may be provided with the option of selecting certain test features, which may include a diagnostics feature, a default feature and/or a diagnostics feature combined with a transaction feature. A user may perform a selection by pressing the virtual button associated with the selection. Information associated with the selection may be provided, for example, to a personalization test module's database (e.g., via a telephonic data communication). A user may select one or more buttons on a physical card that are labeled as, for example, a "Diagnostics" button, a "Default" button, and/or a "Send diagnostics with transaction" button. Information indicative of that selection may then be communicated from the card to a card reader (e.g., via magnetic stripe data or RFID data) and then provided to a personalization test module and/or remote database. The personalization test module may then store the information communicated for manual or automated processing (e.g., a personalization test module may monitor the information remotely and may issue warnings based on the information received if a problem with the device is exposed based upon the information received).

Processing of an information exchange associated with a diagnostics feature may, for example, include receiving diagnostic information and data (e.g., serial number and battery voltage level) from a device. A personalization test module may receive the information and provide the information to a repository or database. The database may, for example, be indexed by serial number and may allow access to the database to obtain a complete history of diagnostic information that may have been obtained from the device since its inception.

Processing of an information exchange associated with a default feature may, for example, include receiving default information (e.g., data contained within memory of a device). A personalization test module may compare the default information to information that should have been received from the device to determine whether the device is operating normally.

Diagnostics information may, for example, be communicated during a transaction. Accordingly, for example, diagnostic information (e.g., a variable associated with battery voltage magnitude) may be included within a magnetic stripe message (e.g., within discretionary data fields of a magnetic stripe message). Backend processing may forward the diagnostic information to a personalization test module and/or a remote database, which may catalog the information that may be indexed according to serial number. The indexed information may be analyzed and appropriate action may be taken (e.g., diagnostic data sent with a transaction may expose a device whose battery voltage is low which may then initiate automatic replacement of the device).

Figure 7:
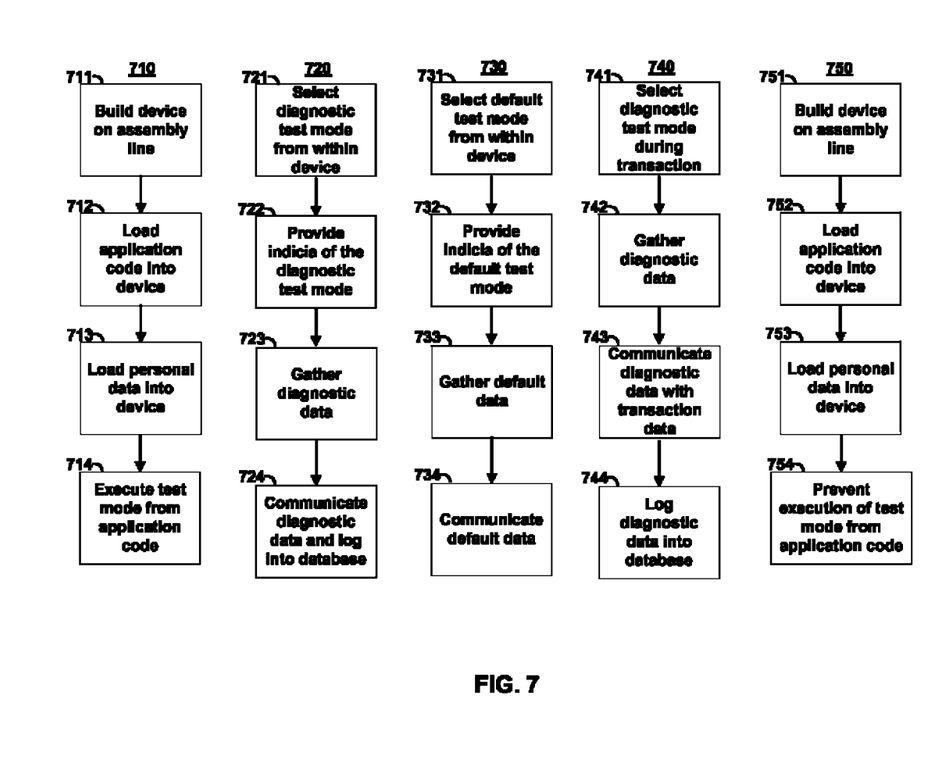
FIG. 7 is an illustration of process flow charts constructed in accordance with the principles of the present invention.

A flow diagram of process sequences is shown in FIG. 7. Step 711 of sequence 710 may include, for example, building a device on an assembly line, where the device may be constructed using one or more electronics packages laminated between top and bottom layers of laminate sheets to form a device having, for example, top, bottom, and middle layers. Executable application code may, for example, be downloaded (e.g., as in step 712) into a processor's memory and/or downloaded to a memory external to the processor for execution by the processor. Personal data (e.g., account number, account holder's name, and expiration date) may be programmed (e.g., via IR communications) into the device (e.g., as in step 713). In step 714, the executed application code may allow a code to be entered into the programmed device (e.g., a sequence of one or more button presses) to cause the device to enter a test mode where diagnostic data, default data, or any other type of data, may be communicated by the device to, for example, a personalization test module. A processor of the device may, for example, erase previously programmed personal data in step 714 to allow new personal data to be programmed into a memory of the device.

Step 721 of sequence 720 may include, for example, selecting a diagnostic test mode to be executed by a device by entering a diagnostic test mode command sequence into the device (e.g., a sequence of one or more button presses). The device may provide indicia (e.g., visible feedback, audible feedback, or tactile feedback) that may indicate to the user that a diagnostic test mode is activated within the device (e.g., as in step 722).

Diagnostic data may be gathered by a processor of the device (e.g., as in step 723), which may include statistical information associated with the device, such as the number of times the device has communicated to a reader device (e.g., the number of times the device has communicated magnetic stripe information to a magnetic stripe reader) or a voltage magnitude of voltage being provided by an internal battery of the device.

In step 724, the diagnostic data may be communicated (e.g., the diagnostic data may be communicated within a magnetic stripe message to a magnetic stripe reader of a personalization test module) and logged into a database. All diagnostic data gathered for any device may be uniquely indexed per device (e.g., all diagnostic data may be indexed based on a serial number of each device). Accordingly, for example, diagnostic data may be logged into a database during production stages of each device and throughout the life of each device (e.g., 2-4 years after producing the device) and may be recalled from the database at any time.

Step 731 of sequence 730 may include, for example, selecting a default test mode to be executed by a device by entering a default test mode command sequence into the device (e.g., a sequence of one or more button presses). The device may provide indicia (e.g., visible feedback, audible feedback, or tactile feedback) that may indicate to the user that a default test mode is activated within the device (e.g., as in step 732).

Default data may be gathered by a processor of the device (e.g., as in step 733), which may include default data stored within a memory of the device. In step 734, the default data may be communicated (e.g., the default data may be communicated within a magnetic stripe message to a magnetic stripe reader of a personalization test module). Accordingly, for example, the personalization test module may compare the received default data to data that should have been received from the device to determine whether the device is operating correctly.

In step 741 of sequence 740, an operational diagnostic test mode may be selected (e.g., by pressing a button sequence associated with the operational diagnostic test mode) that may be associated with a transaction (e.g., a purchase transaction). Diagnostic data (e.g., battery voltage and swipe count) may be gathered in step 742 and communicated in step 743 along with magnetic stripe information to complete a transaction (e.g., diagnostic data may be populated within discretionary data fields of a magnetic stripe message). The discretionary data may be parsed from the magnetic stripe message and logged into a database accessible by a personalization test module for future access.

Step 751 of sequence 750 may include, for example, building a device on an assembly line, where the device may be constructed using one or more electronics packages laminated between top and bottom layers of laminate sheets to form a device having, for example, top, bottom, and middle layers. Executable application code may, for example, be downloaded (e.g., as in step 752) into a processor's memory and/or downloaded to a memory external to the processor for execution by the processor. Personal data (e.g., account number, account holder's name, and expiration date) may be programmed (e.g., via IR communications) into the device (e.g., as in step 753). In step 754, the executed application code may prevent a code from being entered into the programmed device that may cause the device to enter a personalization mode where diagnostic and/or default data may be communicated by the device or that may cause the device to accept programming information.

Persons skilled in the art will appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A system comprising;
   a card including,
   a diagnostic meter,
   default data, and
   first and second buttons; and
   a test fixture, wherein said test fixture receives diagnostic data generated by said diagnostic meter based on a signal from said first button and said test fixture receives said default data based on a signal from said second button.

2. A method comprising;
   providing first manual input to generate a first signal in a device, a processor of said device operable to communicate first data to a reader device to complete a purchase transaction based on said first signal; and
   providing second manual input to generate a second signal in said device, said processor operable to communicate second data to said reader device to provide diagnostic data associated with said device on said second signal.

3. A device comprising:
   a first button;
   a second button; and
   a reader communications device,
   wherein said reader communications device is operable to communicate payment information based on a signal from said first button and said reader communications device is operable to communicate test information based on a signal from said second button.

4. The device of claim 3, wherein said device is an e-reader.

5. The device of claim 3, wherein said device is an electronic tablet.

6. The device of claim 3, wherein said device is a mobile cellular phone.

7. The device of claim 3, wherein said device is a powered card.

8. The device of claim 3, wherein said reader communications device is a dynamic magnetic stripe communications device.

9. The device of claim 3, wherein said reader communications device is an EMV chip.

10. The device of claim 3, wherein said reader communications device is an RFID.

11. The device of claim 3, wherein said reader communications device is an IR device.

* * * * *